US009772438B2

United States Patent
Chu et al.

(10) Patent No.: US 9,772,438 B2
(45) Date of Patent: Sep. 26, 2017

(54) BACKLIGHT, DISPLAY PANEL AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Hanqi Chu, Beijing (CN); Jinmoo Park, Beijing (CN); Shounian Chen, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 131 days.

(21) Appl. No.: 14/573,626

(22) Filed: Dec. 17, 2014

(65) Prior Publication Data

US 2016/0054504 A1    Feb. 25, 2016

(30) Foreign Application Priority Data

Aug. 20, 2014  (CN) .......................... 2014 1 0411694

(51) Int. Cl.
  *G02B 6/00*  (2006.01)
  *F21V 8/00*  (2006.01)

(52) U.S. Cl.
  CPC ......... *G02B 6/0068* (2013.01); *G02B 6/0021* (2013.01)

(58) Field of Classification Search
  CPC .. G02B 6/0026; G02B 6/0073; G02B 6/0011; G02B 6/0013; G02B 6/0021; G02B 6/0068
  See application file for complete search history.

(56) References Cited

U.S. PATENT DOCUMENTS 8,303,152 B2 * 11/2012 Kawashima ......... G02B 6/0021
                                                        349/65
2004/0130912 A1    7/2004 Miyashita
(Continued)

FOREIGN PATENT DOCUMENTS

CN           2638097 Y      9/2004
CN        101446711 A       6/2009
(Continued)

OTHER PUBLICATIONS

1st office action issued in corresponding Chinese application No. 201410411694.8 dated Jun. 21, 2016.

*Primary Examiner* — Anh Mai
*Assistant Examiner* — Nathaniel Lee
(74) *Attorney, Agent, or Firm* — Nath, Goldberg & Meyer; Joshua B. Goldberg; Stanley N. Protigal

(57) ABSTRACT

The present invention provides a backlight, a display panel and a display device, The backlight includes: a first light source and a second light source, the brightness of light emitted from the first light source is different from that of light emitted from the second light source; and a light guide plate, the first light source and the second light source are disposed above the same end surface of an edge of the light guide plate, and light-emitting surfaces of the first light source and the second light source face the end surface of the edge of the light guide plate, a light mixing structure is disposed on the end surface of the edge of light guide plate and is capable of mixing the light emitted from the first light source and the light emitted from the second light source into light with uniform brightness.

7 Claims, 3 Drawing Sheets

(56) References Cited

U.S. PATENT DOCUMENTS

2009/0080216 A1* 3/2009 Tanabe .................. G02B 6/002
362/612
2009/0135625 A1* 5/2009 Yang .................... G02B 6/0021
362/613

FOREIGN PATENT DOCUMENTS

CN  101551549 A  10/2009
JP  2002-163914 A  6/2002

\* cited by examiner

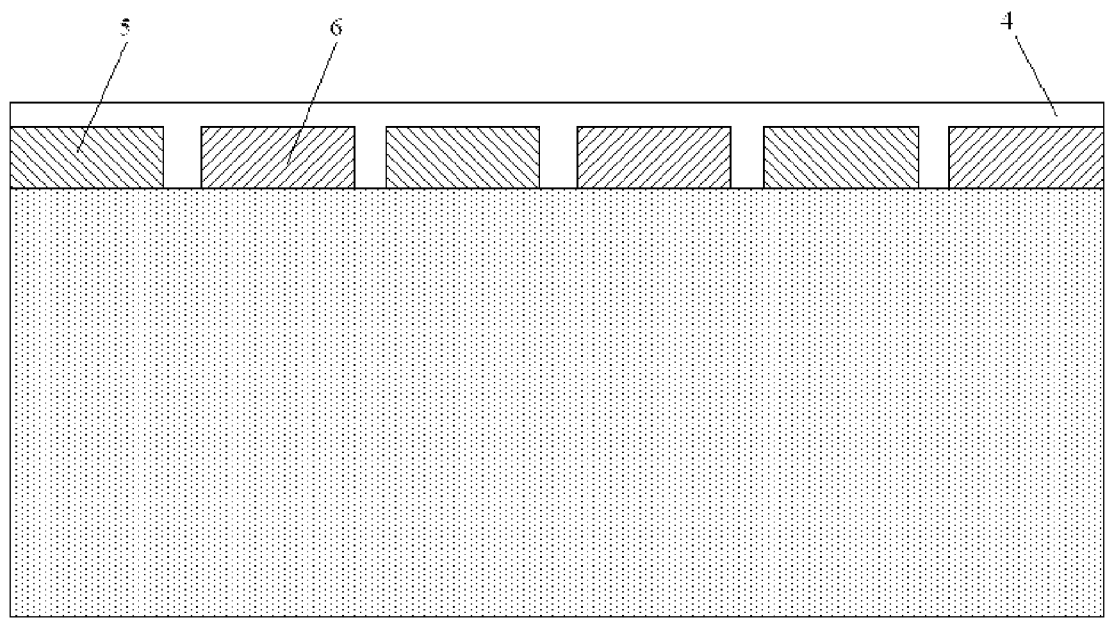
Fig. 1 *(prior art)*
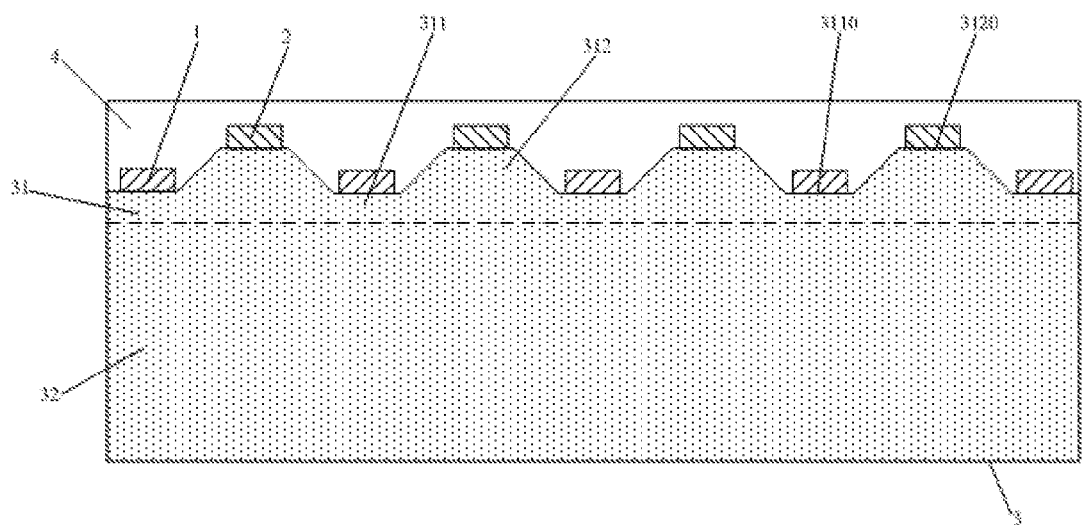
Fig. 2

BACKLIGHT, DISPLAY PANEL AND DISPLAY DEVICE

FIELD OF THE INVENTION

The present invention relates to the field of display technology, and in particular, relates to a backlight, a display panel and a display device.

BACKGROUND OF THE INVENTION

Liquid crystal display (LCD for short) device, due to its advantages of small size, low power consumption, less radiation, and the like, has become a mainstream product of flat-panel display devices at present. A backlight is an essential component of the liquid crystal display device and is used for providing back light for the display panel in display.

A side type backlight is usually adopted in order to facilitate a tendency of the display panel to be thinner and lighter. In the side type backlight, a light source is generally arranged at an edge of a light guide plate on one side thereof, so that the light emitted from the light source enters the light guide plate from a side surface of the light guide plate edge. The light source in the backlight is usually a LED light bar. A conventional LED light bar is generally assembled by a plurality of LEDs with the same brightness level, so as to ensure a good light-entering effect. However, in a backlight product, a plurality of LED light bars with several brightness levels are needed to satisfy the manufacture requirement. The brightness levels of the LEDs in different light bars may be different in a backlight product, which results in wide fluctuation range of brightness of the backlight product, which uses various light bars.

In order to solve the problem of wide fluctuation range of brightness of the backlight product which uses various light bars, the backlight in a current large-size display panel usually uses a LED light bar with mixed brightness as the light source. The LED light bar with mixed brightness refers to that the LEDs with different brightness (for example, different batches of LEDs) are alternately arranged on a flexible printed circuit (FPC) board and this arrangement can mix the brightness of LEDs with different brightness, so that the brightness of various LED light bars assembled by LEDs with different brightness tends to be uniform, thereby reducing the brightness fluctuation among various backlights.

FIG. 1 illustrates the arrangement of backlight in the above-mentioned large-size display panel. The LED light bar is assembled by a plurality of first LEDs 5 and second LEDs 6. The brightness of the plurality of first LEDs 5 is the same and the brightness of the plurality of second LEDs 6 is the same, the brightness of the first LEDs 5 is different from that of the second LEDs 6. The plurality of first LEDs 5 and the plurality of second LEDs 6 are arranged on a printed circuit board 4 alternately, so as to mix the brightness of the LEDs 5 with the brightness of the LEDs 6, and thereby the brightness of various backlights tends to be uniform.

Similarly, at present, in a small-size display panel, the problem of wide fluctuation range of brightness among various backlights is attempted to be solved by using the light source arranged as above. However, since the back light area in the small-size display panel is relatively small, the small-size display panel is sensitive to brightness mixing. A glowworm phenomenon (i.e., a plurality of alternately dark and bright dots appear on the display panel due to a great contrast between the high brightness area and the low brightness area) is likely to occur when brightness mixing of the light sources with different brightness is realized in a small area. As a result, the above arrangement of the light source for brightness mixing in the large-size display panel may not solve the problem of wide fluctuation range of brightness among various backlights in the small-size display panel.

SUMMARY OF THE INVENTION

In order to solve the above technical problems in the prior art, the present invention provides a backlight, a display panel and a display device. In this backlight, a light mixing structure is disposed on the end surface of the edge of light guide plate, so as to avoid the glowworm phenomenon in the effective back light area of the small-size backlight and hence to improve the back light effect of the backlight. Meanwhile, this configuration can also solve the problem of wide fluctuation range of brightness among various backlights.

The present invention provides a backlight, including: a first light source, a second light source and a light plate, the first light source and the second light source are disposed above the same end surface of an edge of the light guide plate, and light-emitting surfaces of the first light source and the second light source face the end surface of the edge of light guide plate, the brightness of light emitted from the first light source is different from that of light emitted from the second light source, a light mixing structure is disposed on the end surface of the edge of the light guide plate and is capable of mixing the light emitted from the first light source and the light emitted from the second light source into light with uniform brightness.

Preferably, the number of the first light source and the number of the second light source are both greater than one, and the brightness of the light emitted from each of the first light sources is lower than that of the light emitted from each of the second light source.

Preferably, the light mixing structure includes a plurality of concave parts and a plurality of convex parts, which are distributed consecutively and alternatively, the first light sources are disposed in one-to-one correspondence with the concave parts, and the second light sources are disposed in one-to-one correspondence with the convex parts.

Preferably, a distance between the light-emitting surface of the first light source and a bottom surface of the corresponding concave part is equal to that between the light-emitting surface of the second light source and a top surface of the corresponding convex part.

Preferably, cross sections, which are parallel to the light guide plate and perpendicular to the end surface of the edge of the light guide plate, of the concave parts and the convex parts have shapes of similar or identical trapezoids, and the bottom surfaces of the concave parts and the top surfaces of the convex parts respectively correspond to shorter bases of the trapezoids in the cross sections; the light-emitting surfaces of the first light sources are attached to the bottom surfaces of the corresponding concave parts, and the light-emitting surfaces of the second light sources are attached to the top surfaces of the corresponding convex parts.

Preferably, the cross sections, which are parallel to the light guide plate and perpendicular to the end surface of the edge of the light guide plate, of the concave parts and the convex parts have shapes of identical isosceles trapezoids, and illumination areas of the first light source and the second light source in the cross sections are the area between two legs of each convex part.

Preferably, a height of the isosceles trapezoid and an included angle between the leg and a longer base of the isosceles trapezoid are determined by a difference of brightness between the light emitted from the first light source and the second light source, the height of the isosceles trapezoid and the included angle between the leg and the longer base of the isosceles trapezoid increase with an increase of the difference of brightness between the light emitted from the first light source and the second light source, and decrease with a decrease of the difference of brightness between the light emitted from the first light source and the second light source.

Preferably, contours of cross sections, which are parallel to the light guide plate and perpendicular to the end surface of the edge of the light guide plate, of the concave parts and the convex parts have shapes of similar or identical parabolic curves, opening directions of the parabolic curves are different between the concave parts and the convex parts; the light-emitting surfaces of the first light sources 1 are attached to the bottom surfaces of the corresponding concave parts, and the light-emitting surfaces of the second light sources are attached to the top surfaces of the corresponding convex parts.

Preferably, illumination areas of the first light source and the second light source in the cross sections are the same as an opening area of the convex part.

Preferably, the backlight further includes a printed circuit board used for providing power for the first light sources and the second light sources, the printed circuit board is disposed under the first light sources and the second light sources, and the first light sources and the second light sources are electrically connected to the printed circuit board.

Preferably, the first light sources and the second light sources are LEDs.

The present invention provides a display panel, comprising the above backlight.

The present invention provides a display device, comprising the above display panel.

The beneficial effects of the present invention: in the backlight according to the present invention, a light mixing structure is disposed on the end surface of the edge of light guide plate, and is capable of mixing the light having different brightness, which is emitted from the first light sources and the second light sources into light with uniform brightness, so as to avoid the glowworm phenomenon in the effective back light area of the small-size backlight and hence to improve the back light effect of the backlight. Meanwhile, this configuration may reduce the difference of brightness between different backlights and make the brightness of various backlights tend to be uniform, thereby solving the problem of wide fluctuation range of brightness among various backlights.

The display effect of the display panel according to the present invention can be improved by using the above backlight.

The display quality of the display device according to the present invention can be improved by using the above display panel.

BRIEF DESCRIPTION OF THE DRAWINGS

FIG. 1 is a top view of a structure of a backlight in the prior art;

FIG. 2 is a top view of a structure of a backlight according to Embodiment 1 of the present invention;

DETAILED DESCRIPTION OF THE EMBODIMENTS

Figure 3:
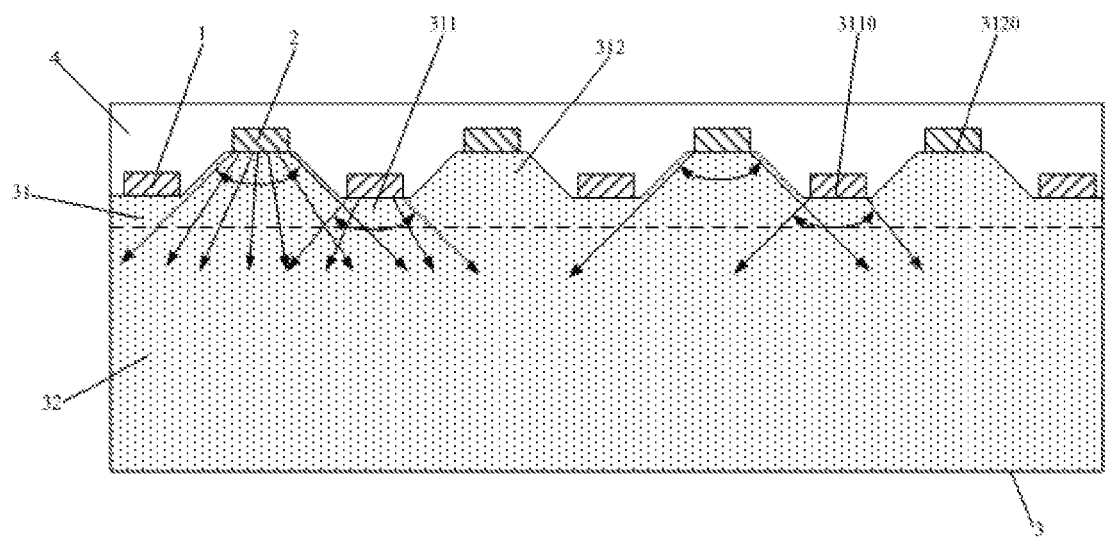
FIG. 3 is a schematic diagram illustrating illumination areas of light emitted from first light sources and second light sources in FIG. 2.

In order to enable a person skilled in the art to better understand the technical solutions of the present invention, a backlight, a display panel and a display device will be further described in detail in conjunction with the accompanying drawings and specific embodiments.

Embodiment 1

As shown in FIG. 2, the present embodiment provides a backlight including first light sources 1, second light sources 2 and a light guide plate 3. The first light sources 1 and the second light sources 2 are disposed above the same end surface of an edge of the light guide plate 3. Light-emitting surfaces of the first light sources 1 and the second light sources 2 face the end surface of the edge of the light guide plate 3. The brightness of light emitted from the first light source 1 is different from that of light emitted from the second light source 2. A light mixing structure 31 is disposed on the end surface of the edge of the light guide plate 3, and is capable of mixing the light emitted from the first light source 1 and the light emitted from the second light source 2 into light with uniform brightness.

Disposing the light mixing structure 31 may avoid the glowworm phenomenon (i.e., a plurality of alternately dark and bright dots appear in an effective back light area 32 due to a great contrast between the high brightness area and the low brightness area) in an effective back light area 32 (i.e., an area of the backlight actually used for display) of the small-size backlight, so as to improve the back light effect of the backlight. Meanwhile, this configuration may reduce the difference of brightness among various backlights and make the brightness of various backlights tend to be uniform, thereby solving the problem of wide fluctuation range of brightness among various backlights.

In the present embodiment, the light mixing structure 31 includes a plurality of concave parts 311 and a plurality of convex parts 312, which are distributed consecutively and alternately. The first light sources 1 are disposed in one-to-one correspondence with the concave parts 311, and the second light sources 2 are disposed in one-to-one correspondence with the convex parts 312. The brightness of the light emitted from each of the first light sources 1 is lower than that of the light emitted from each of the second light sources 2. A distance between the light-emitting surface of the first light source 1 and a bottom surface 3110 of the corresponding concave part 311 is equal to a distance between the light-emitting surface of the second light source 2 and a top surface 3120 of the corresponding convex part 312. Such configuration ensures that, in the light guide plate 3, a propagation distance of the light, with larger brightness, emitted from each of the second light sources 2 is longer than that of the light, with smaller brightness, emitted from each of the first light sources 1. Accordingly, the brighter light emitted from each of the second light sources 2, after propagating and diffusing for a longer distance, will have brightness close to the brightness of light emitted from each of the first light sources 1. That is, the concave parts 311 and the convex parts 312 can mix the light emitted from the first light sources 1 and the second light sources 2 to have uniform brightness.

The above configuration ensures that the light emitted from the first light sources 1 and the second light sources 2 can be mixed to have uniform brightness after propagating through the concave parts 311 and the convex parts 312, respectively, so that the back light brightness of the backlight in the effective back light area 32 becomes more uniform, thereby improving the back light effect in the effective back light area 32. Meanwhile, this configuration may reduce the difference in brightness between different backlights and make the brightness of various backlights tend to be uniform, thereby solving the problem of wide fluctuation range of brightness among various backlights.

In the present embodiment, cross sections, which are parallel to the light guide plate 3 and perpendicular to the end surface of the edge of the light guide plate 3, of the concave parts 311 and the convex parts 312 have shapes of similar or identical trapezoids. The bottom surfaces 3110 of the concave parts 311 and the top surfaces 3120 of the convex parts 312 respectively correspond to shorter bases of the trapezoids in the cross sections. The light-emitting surface of the first light source 1 is attached to the bottom surface 3110 of the corresponding concave part 311, and the light-emitting surface of the second light source 2 is attached to the top surface 3120 of the corresponding convex part 312. A certain region is required for mixing the light having different brightness, which is emitted from the first light sources 1 and the second light sources 2, so as to obtain light with uniform brightness after the mixing, and thus the area of the region, in which the light emitted from the first light sources 1 and the second light sources 2 is mixed to have uniform brightness, can be reduced by applying the above configuration, thereby the area of the effective back light region 32 of the backlight is increased correspondingly. In this way, not only the utilization rate of light of the first light sources 1 and the second light sources 2 but also the back light effect of the backlight is improved.

In the present embodiment, as shown in FIG. 3, the cross sections, which are parallel to the light guide plate 3 and perpendicular to the end surface of the edge of the light guide plate 3, of the concave parts 311 and the convex parts 312 have an identical shape of isosceles trapezoid. The illumination areas of the first light source 1 and the second light source 2 in the respective cross sections are the area between the two legs (i.e., the two non-parallel sides) of the convex part 312. For example, the light-emitting areas of the first light source 1 and the second light source 2 radiates light in fan-shaped illumination areas in the cross sections, the shape of the cross section of the convex part 312 is a isosceles trapezoid, the area between the two legs of the isosceles trapezoid is also a fan-shaped area, and the shapes and the sizes of the fan-shaped illumination area and the fan-shaped area between the two legs of the isosceles trapezoid are the same. Accordingly, this configuration can mix the light emitted from the first light sources 1 and the second light sources 2 more uniformly, thereby avoiding the glowworm phenomenon.

Figure 4:
FIG. 4 is a schematic diagram illustrating a size of a concave part or a convex part in FIG. 2.

In the present embodiment, as shown in FIG. 4, the height H of the isosceles trapezoid and an included angle θ between the leg and the longer base of isosceles trapezoid are determined by the difference of brightness between the first light source 1 and the second light source 2. The height H of the isosceles trapezoid and the included angle θ between the leg and the longer base of isosceles trapezoid increase with the increase of the difference of brightness between the first light source 1 and the second light source 2, and decrease with the decrease of the difference of brightness between the first light source 1 and the second light source 2. In the end, it should be ensured that the light emitted from the first light source 1 and the second light source 2 can be mixed to have uniform brightness in the effective back light region 32.

In the present embodiment, the backlight further includes a printed circuit board 4 used for providing power for the first light sources 1 and the second light sources 2, and the printed circuit board 4 is disposed under the first light sources 1 and the second light sources 2. The first light sources 1 and the second light sources 2 are electrically connected to the printed circuit board 4. As the first light sources 1 and the second light sources 2, LEDs are adopted.

It should be noted that the first light sources 1 and the second light sources 2 are not limited to the LEDs, and other forms of light sources such as a bulb, a fluorescent lamp, or the like can also be used as the light sources of the backlight.

Embodiment 2

Figure 5:
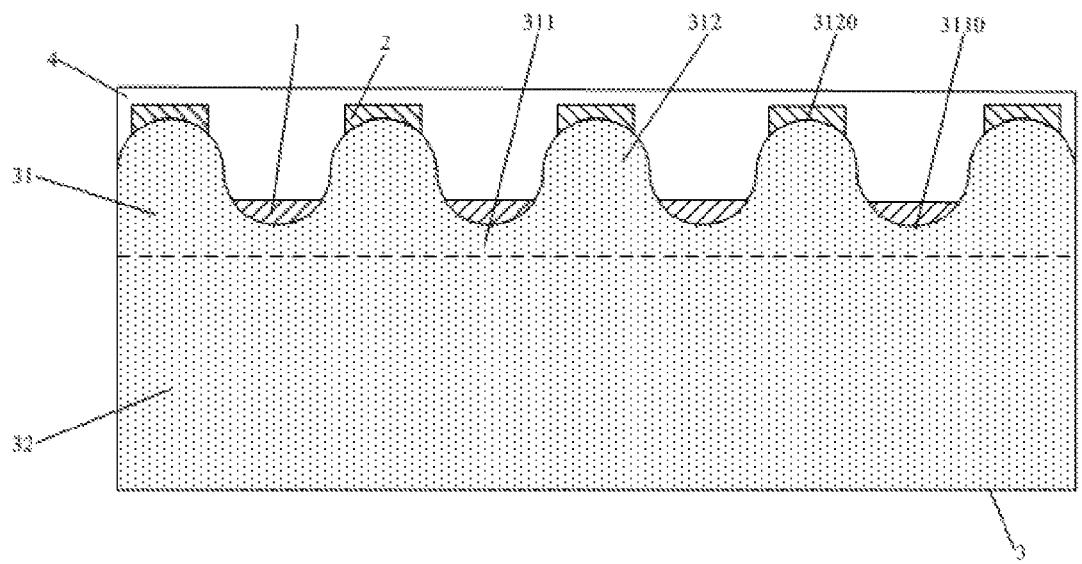
FIG. 5 is a top view of a structure of a backlight according to Embodiment 2 of the present invention.

The present embodiment provides a backlight, as shown in FIG. 5. Unlike Embodiment 1, the shapes of contours of cross sections, which are parallel to the light guide plate 3 and perpendicular to the end surface of the edge of the light guide plate 3, of the concave parts 311 and the convex parts 312 are similar or identical parabolic curves. Opening directions of the parabolic curves are different between the concave parts 311 and the convex parts 312. The light-emitting surface of the first light source 1 is attached to the bottom surface 3110 of the corresponding concave part 311, and the light-emitting surface of the second light source 2 is attached to the top surface 3120 of the corresponding convex part 312.

The area of the region, in which the light emitted from the first light sources 1 and the second light sources 2 is mixed to have uniform brightness, can be reduced by applying the above configuration, thereby the area of the effective back light region 32 of the backlight is increased correspondingly. In this way, not only the utilization rate of light of the first light sources 1 and the second light sources 2 but also the back light effect of the backlight is improved.

Figure 6:
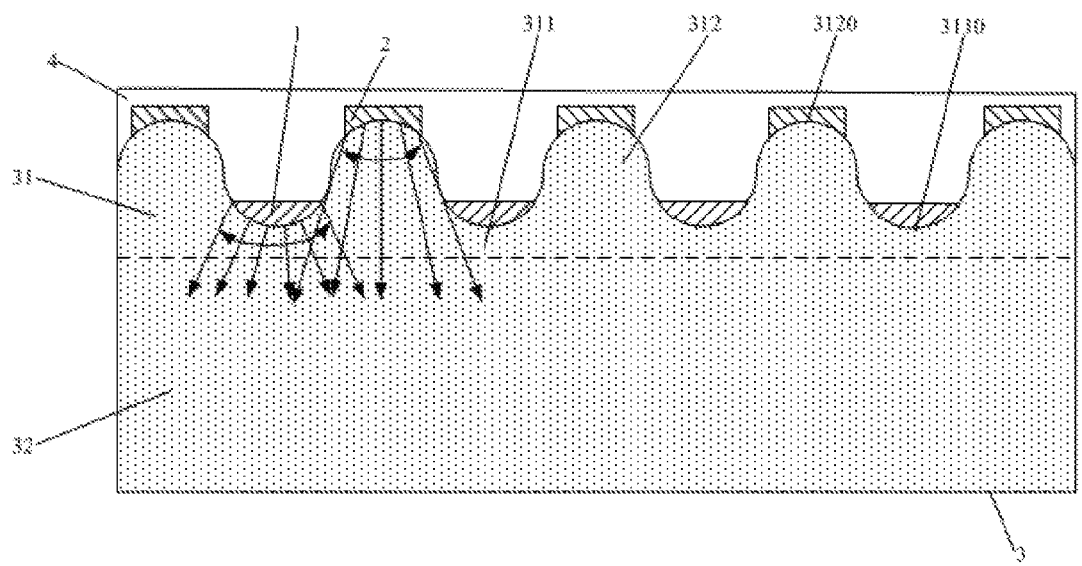
FIG. 6 is a schematic diagram illustrating illumination areas of light emitted from first light sources and second light sources in FIG. 5.

Accordingly, as shown in FIG. 6, the illumination areas of the first light source 1 and the second light source 2 in the cross sections are the same as the opening area of the convex part 312. Such configuration can mix the light emitted from the first light sources 1 and the second light sources 2 more uniformly, thereby avoiding the glowworm phenomenon.

The other components of the backlight in the present embodiment are the same as those in Embodiment 1, and the description thereof will be omitted here.

The beneficial effects of Embodiment 1 and Embodiment 2: in the backlights according to Embodiment 1 and Embodiment 2, a light mixing structure is disposed on the end surface of the edge of the light guide plate, and is capable of mixing the light having different brightness, which is emitted from the first light sources and the second light sources into light with uniform brightness, so as to avoid the glowworm phenomenon in the effective back light area of the small-size backlight and hence to improve the back light effect of the backlight. Meanwhile, this configuration may reduce the difference of brightness between different backlights and make the brightness of various backlights tend to be uniform, thereby solving the problem of wide fluctuation range of brightness among various backlights.

Embodiment 3

The present embodiment provides a display panel including the backlight according to Embodiment 1 or Embodiment 2.

The display effect of the display panel can be improved by using the backlight according to Embodiment 1 or Embodiment 2.

Embodiment 4

The present embodiment provides a display device including the display panel according to Embodiment 3.

The display quality of the display device can be improved by using the display panel according to Embodiment 3.

The display device according to the present invention may be any product or part that has a display function, such as a liquid crystal panel, a liquid crystal television, a display, a mobile phone, a navigator, or the like.

It should be understood that, the above implementations are only exemplary embodiments used for explaining the principle of the present invention, but the present invention is not limited thereto. For a person skilled in the art, various improvements and modifications may be made to the present invention without departing from the spirit and essence of the present invention. These improvements and modifications are also deemed as the protection scope of the present invention.

What is claimed is:

1. A backlight, including:
a first light source and a second light source, wherein the brightness of light emitted from the first light source is different from that of light emitted from the second light source; and
a light guide plate, wherein the first light source and the second light source are disposed above the same end surface of an edge of the light guide plate, light-emitting surfaces of the first light source and the second light source face the end surface of the edge of the light guide plate, and a light mixing structure is disposed on the end surface of the edge of the light guide plate and is capable of mixing the light emitted from the first light source and the light emitted from the second light source into light with uniform brightness,
wherein, the number of the first light source and the number of the second light source are both greater than one, and the brightness of the light emitted from each of the first light sources is lower than that of the light emitted from each of the second light source,
wherein the light mixing structure includes a plurality of concave parts and a plurality of convex parts, which are distributed consecutively and alternately, and the first light sources are disposed in one-to-one correspondence with the concave parts, and the second light sources are disposed in one-to-one correspondence with the convex parts,
wherein, a distance between the light-emitting surface of each of the first light sources and a bottom surface of the corresponding concave part is equal to that between the light-emitting surface of each of the second light sources and a top surface of the corresponding convex part,
wherein, contours of cross sections, which are parallel to the light guide plate and perpendicular to the end surface of the edge of the light guide plate, of the concave parts and the convex parts have shapes of similar or identical parabolic curves, opening directions of the parabolic curves are different between the concave parts and the convex parts,
and wherein the light-emitting surfaces of the first light sources are attached to the bottom surfaces of the corresponding concave parts, and the light-emitting surfaces of the second light sources are attached to the top surfaces of the corresponding convex parts.

2. The backlight according to claim 1, wherein, a distance between the light-emitting surface of each of the first light sources and a bottom surface of the corresponding concave part is equal to that between the light-emitting surface of each of the second light sources and a top surface of the corresponding convex part.

3. The backlight according to claim 1, wherein, illumination areas of the first light source and the second light source in the cross sections are the same as an opening area of the convex part.

4. The backlight according to claim 1, further including a printed circuit board used for providing power for the first light sources and the second light sources, the printed circuit board is disposed under the first light sources and the second light sources, and the first light sources and the second light sources are electrically connected to the printed circuit board.

5. The backlight according to claim 1, the first light sources and the second light sources are LEDs.

6. A display panel, comprising the backlight according to claim 1.

7. A display device, comprising the display panel according to claim 6.

* * * * *